July 1, 1969

B. T. BUSCH 3,452,788

AUTOMATIC STAVE EQUALIZING MACHINE

Filed Aug. 22, 1966

BENNIE T. BUSCH
*INVENTOR.*

BY

Robert K. Rhea
AGENT

BENNIE T. BUSCH
INVENTOR.

BY

Robert K. Rhea
AGENT

BENNIE T. BUSCH
INVENTOR.

BY

Robert K. Rhea
AGENT

United States Patent Office 3,452,788
Patented July 1, 1969

3,452,788
AUTOMATIC STAVE EQUALIZING MACHINE
Bennie T. Busch, P.O. Box 543, Mena, Ark. 71953
Filed Aug. 22, 1966, Ser. No. 573,895
Int. Cl. B27b 5/04, 5/34
U.S. Cl. 143—36                                                4 Claims

ABSTRACT OF THE DISCLOSURE

A stave equalizing machine comprising an open frame having a motor driven billet carrying lower conveyer moving through the frame between frame supported rotating saws. An upper conveyer extending through the frame cooperates with the lower conveyer in impinging the billets therebetween.

---

The present invention relates to wood cutting saws and more particularly to a stave forming billet length equalizing machine.

In the manufacture of wooden barrel staves it is essential that the length of the billets, from which the staves are formed, be of identical length.

It is, therefore, the principal object of this invention to provide a machine employing a pair of circular saws for trimming off the respective end portions of billets of different lengths and sizes when passed through the machine.

Another object is to provide a billet length equalizing machine wherein the spacing between the saws may be adjusted to achieve the desired length of billet.

Still another object is to provide a machine of this class wherein cooperatingly positioned pairs of chains form conveyers for moving the billets toward and beyond the circular saws.

The present invention accomplishes these and other objects by mounting a pair of spaced-apart circular saws within and transversely of a frame. Conveyer means progressively move billets toward and beyond the saws longitudinally of the frame.

Figure 1:
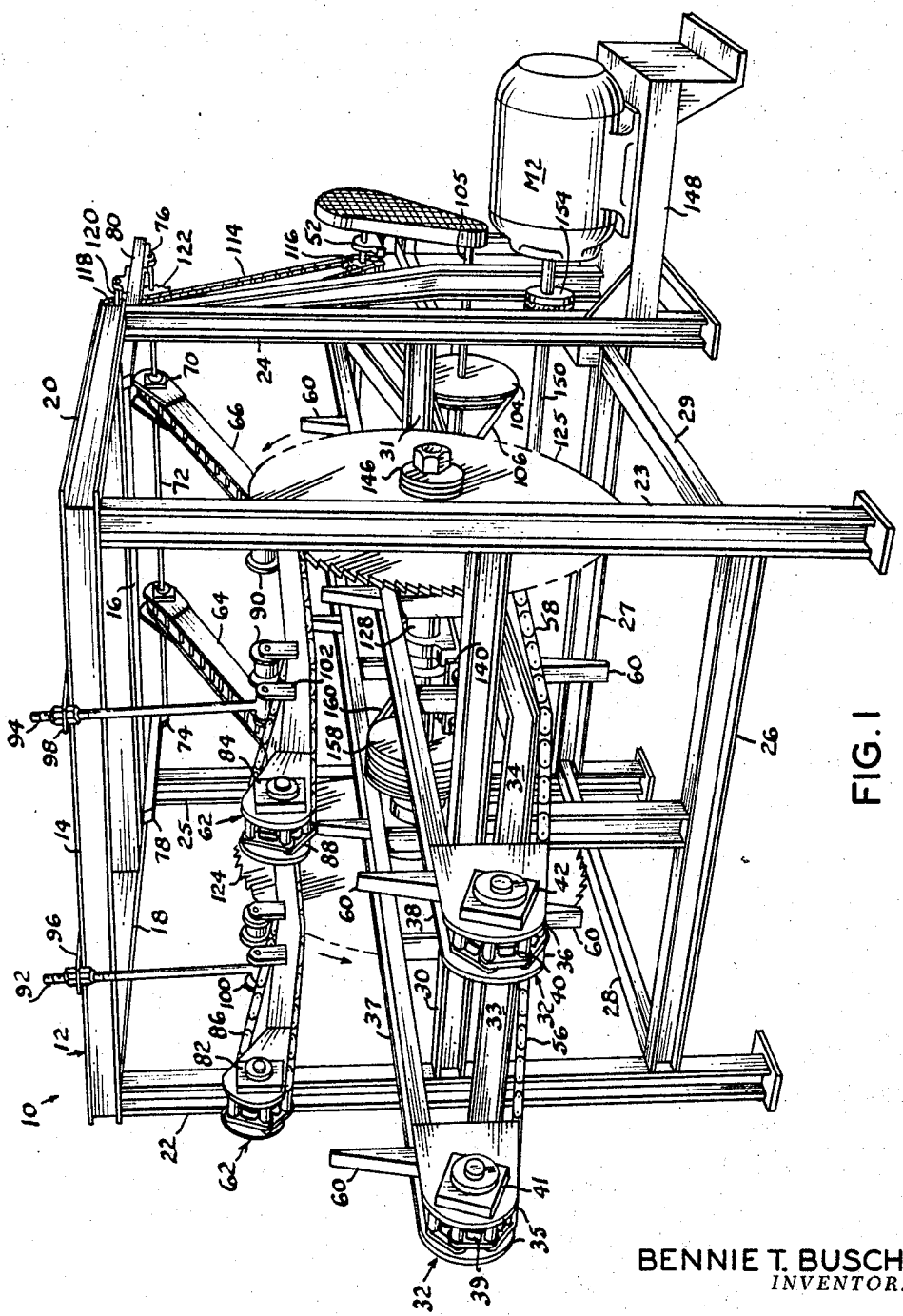
Figure 2:
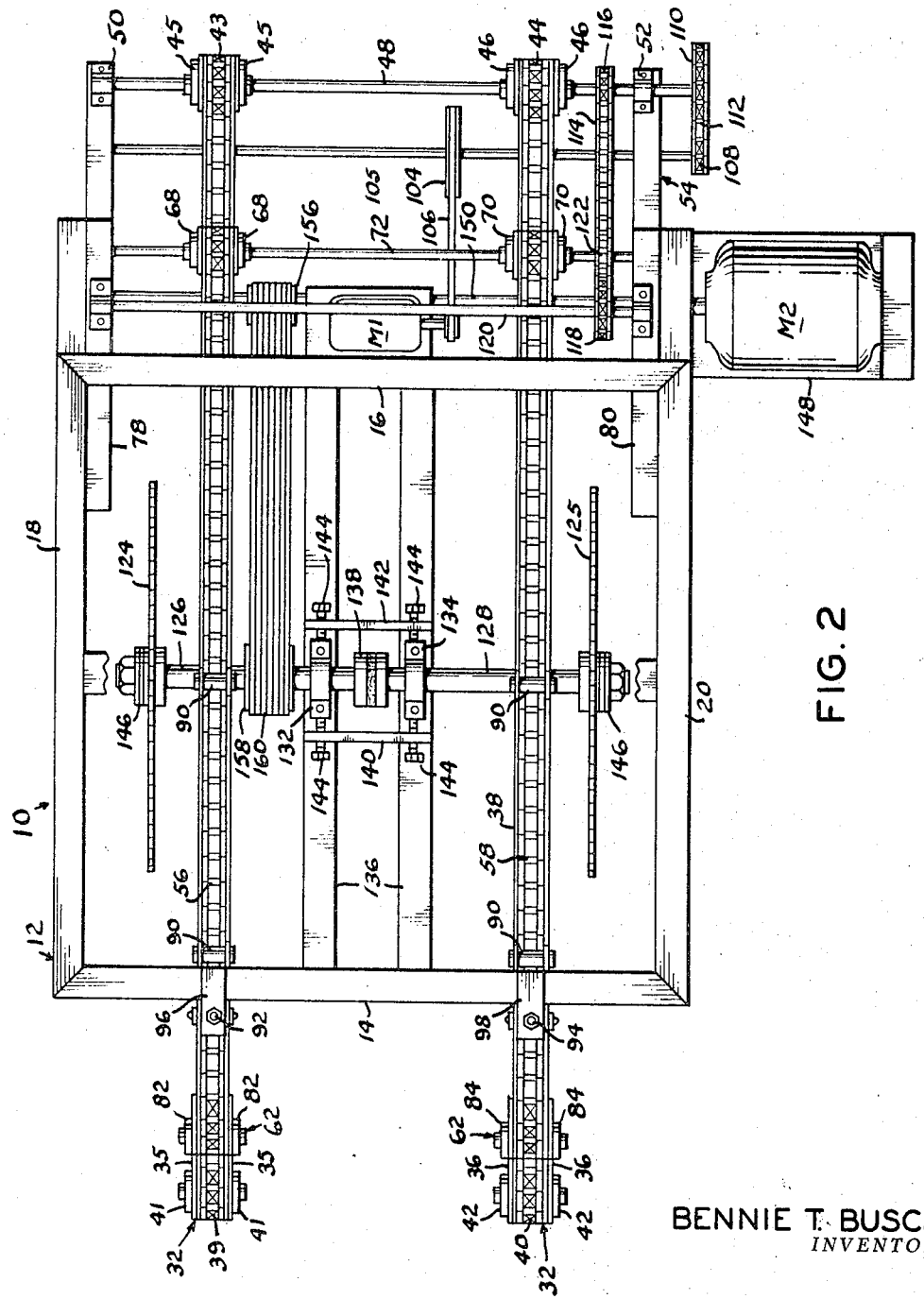
Figure 3:
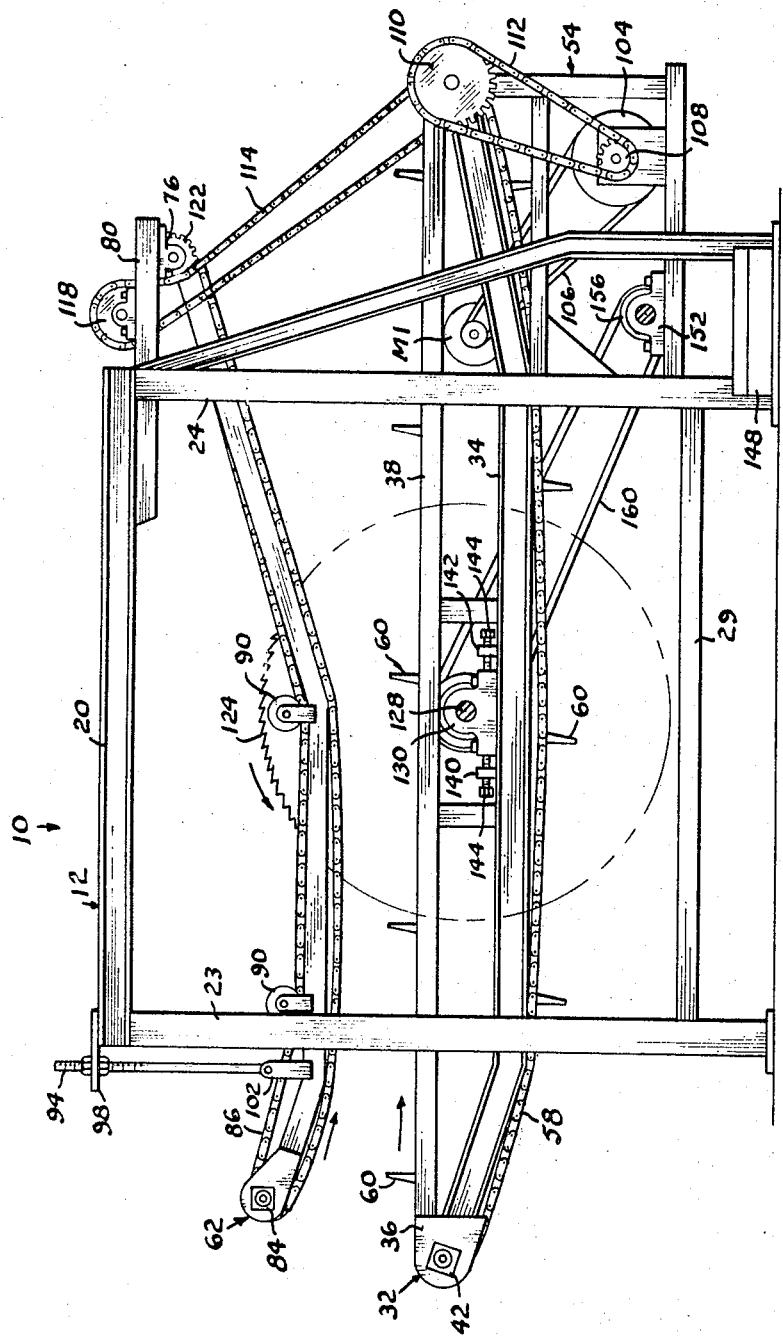

Other objects will be apparent from the following description when taken in conjunction with the accompanying three sheets of drawings, wherein:

FIGURE 1 is a perspective view of the machine;
FIGURE 2 is a top plan view with one frame brace broken away for clarity; and
FIGURE 3 is a side elevational view with the saw driving motor and one saw removed for clarity.

Like characters of reference designate like parts in those figures of the drawings in which they occur.

In the drawings:

The reference numeral 10 indicates the device, as a whole, which is substantially rectangular in general configuration. The device 10 comprises an open upright frame 12 preferably formed of rigid structural members such as H-beams or I-beams including spaced-apart front and rear top members 14 and 16, respectively, which are interconnected by top side members 18 and 20. The top front, rearward and side members, numbered 14 through 20, are supported by vertical front posts 22 and 23 and rear posts 24 and 25. Similarly lower braces 26, 27, 28 and 29 extend horizontally between and are respectively connected to the lower end portions of the posts 22, 23, 24 and 25. Intermediate cross braces 30 and 31 extend horizontally between and are connected, respectively, to the front posts 22 and 23 and rearward posts 24 and 25.

Material moving lower conveyer means 32 extends longitudinally through and projects beyond the forward and rearward central portion of the frame. The conveyers 32 include a pair of parallel spaced-apart supports 33 and 34 which are rigidly connected to the depending surface of the cross braces 30 and 31. The respective end portions of the supports 33 and 34 are upwardly inclined and are connected, respectively, by opposing pairs of side plates 35 and 36 to the respective end portions of a pair of horizontal substantially U-shaped guide members 37 and 38 overlying the cross braces 30 and 31 with the legs of the guide members facing upwardly. Idling sprocket wheels 39 and 40 are respectively journaled between the pairs of plates 35 and 36 by bearings 41 and 42. The other or rearward end portions of the conveyer supports and U-shaped guide members are similarly connected and provided with sprocket wheels 43 and 44 and bearings 45 and 46 having a shaft 48 extending through the bearings and connected to the sprocket wheels 43 and 44 in driving relation. The respective end portions of the shaft 48 are journaled by bearings 50 and 52 in turn supported by suitable frame members 54 connected with and extending rearwardly of the frame 12. A pair of endless chains 56 and 58 are entrained around the sprockets 39–40 and 43–44 longitudinally of the respective guide members and supports, respectively. The chains are each provided with outstanding cooperatingly positioned fingers 60 spaced longitudinally of the chains for the purposes presently explained.

Similarly material hold-down or upper conveyer means 62 extends longitudinally through the frame 12 in parallel spaced relation above the lower conveyer means 32. The hold-down conveyer means 62 includes a pair of U-shaped upper guide members 64 and 66 each having an intermediate portion disposed substantially parallel in vertically spaced relation with respect to the intermediate portion of the guide members 37 and 38 and opposing upwardly inclined end portions. The rearward end portions of the members 64 and 66 are similarly provided with sprocket wheels and bearings 68 and 70 driveably connected with a shaft 72 journaled at its respective end portions by bearings 74 and 76 supported by rearwardly extending bearing supports 78 and 80 connected with the top portion of the frame 12. The forward end of the members 64 and 66 are similarly provided with idling sprocket wheels journaled by bearings 82 and 84. Endless chains 86 and 88 are similarly entrained around the sprockets at the respective ends of the members 64 and 66. Rollers 90, transversely connected with and projecting upwardly above the respective member 64 and 66 in longitudinal spaced relation, maintain the chains 86 and 88 adjacent the upper surface of the respective member 64 and 66. The forward free end portions of the hold-down conveyer 62 are adjustably connected to the top front frame member 14 by a pair of nuts and bolts 92 and 94 extending through plates 96 and 98 secured to the member 14. The other depending end of the bolts 92 and 94 are pivotally connected to the respective member 64 and 66 between pairs of upstanding ears 100 and 102.

A conveyor driving motor M1 is mounted in the frame rearwardly of the intermediate support 31 and is driveably connected by its drive shaft to a pulley 104, mounted on a shaft 105 and journaled by bearings, not shown, in turn supported by the frame extensions 54, by a belt 106. The shaft 105 drives a coaxially mounted sprocket 108 in turn connected to a conveyor driving sprocket 110 mounted on the shaft 48 by a chain 112. A conveyor driving chain 114 is entrained around a sprocket 116 mounted on the shaft 48 and around an idling sprocket 118 mounted on a shaft 120 journaled, at its opposing ends, by bearings secured to the rearwardly extending supports 78 and 80. The chain 114 is partially entrained around a driving sprocket 122 secured to the shaft 72 thus it may be seen that operation of the motor M1 simultaneously drives the upper and lower conveyors at the same rate of travel and in the direction shown by the arrows.

A pair of circular saws 124 and 125 are mounted within the frame 12 laterally of the lower conveyors 32 on substantially axially aligned arbors 126 and 128, respectively. The outer end portions of the arbors 126 and 128 are supported by bearings 130, only one being shown (FIG. 3), while the inner end portions of the arbors are adjustably supported by bearings 132 and 134 mounted on suitable supports 136 extending between the intermediate supports 30 and 31 in horizontal parallel spaced relation. A flexible coupling 138 joins the inwardly disposed ends of the arbors 126 and 128. Upstanding plates 140 and 142, transversely secured to the supports 136 forwardly and rearwardly of the bearings 132 and 134, permit adjustment of the last named bearings longitudinally of the frame by stud bolts 144. The purposes of adjusting the bearings 132 and 134 is to dispose the longitudinal axis of the saw arbors 126 and 128 on an obtuse angle to achieve a toe-in of the saws 124 and 125 toward the forward end of the frame for the purposes presently explained.

The saws 124 and 125 are adjustable longitudinally of their respective arbor by spacers and nuts 146 so that the spacing between the saws may be regulated as desired.

A saw driving motor M2, mounted on a suitable support 148 laterally of the rearward end of the frame, has its drive shaft connected with a shaft 150 journaled by frame supported bearings 152, only one being shown (FIG. 3), through a flexible coupling 154. The shaft 150 is provided with a V-belt pulley 156 aligned with a similar V-belt pulley 158 on the saw arbor 126. A plurality of V-belts 160, entrained around the pulleys 156 and 158, drive the saws 124 and 125 in the direction shown by the arrows when the motor M2 is operated.

*Operation*

In operation the device is assembled as described hereinabove and positioned between a supply of billets and a barrel stave forming machine, neither of which are shown. The motors M1 and M2 are placed in operation for moving the upper and lower conveyors and rotating the saws. The attendant manually positions a billet transversely of the lower conveyors 32 wherein a pair of fingers 60 engage the billet and progressively move it toward the saws 124 and 125. The vertical spacing between the lower surface of the intermediate portion of the upper conveyors 62 and the upper surface of the lower conveyors 32 is adjusted by the bolts 92 and 94 so that the chains 86 and 88 of the upper conveyors contact an upper peripheral surface of the billet as it is moved between the saws thus preventing any undesired chattering or other movement of the billet when engaged by the saws. The forwardly directed toe-in feature of the saws permits the billet to pass freely between the rearward peripheral portion of the saws after being cut and prevents any pick-up of the billet by the saw teeth by their rearward peripheral portion. After being cut to the predetermined length the billet is discharged from the conveyors 32 at the rearward end of the machine.

Obviously the invention is susceptible to some change or alteration without defeating its practicability, and I therefore do not wish to be confined to the preferred embodiment shown in the drawings and described herein.

I claim:

1. A billet length equalizing machine, comprising: an open upright frame; conveyer means including material supporting conveyors comprising a pair of spaced-apart lower guide members extending through and supported by said frame, sprocket means transversely journaled by the respective end portion of each said lower guide member, and an endless chain entrained around each said guide member and the sprocket means at its respective ends for moving billets through said frame; a pair of saws; means mounting said saws within said frame, transversely and outwardly of said conveyor means, in substantially parallel spaced relation, said saw mounting means comprising a pair of substantially axially aligned arbors each coaxially connected at one end portion to one of said saws, and inner and outer bearings supported by said frame and journaling the respective end portions of said arbors; means for driving said saws and said conveyor means; and a flexible coupling coaxially connecting the innermost end portions of said arbors, and adjusting screws connected with said frame and engageable with said inner bearings for moving the flexible connected end portion of said arbors to form an obtuse angle transversely of said frame.

2. Structure as specified in claim 1 in which said conveyor means further includes material hold-down conveyors comprising a pair of upper guide members pivotally supported, at one end, by said frame for vertical pivoting movement in parallel spaced relation above said lower guide members, hold-down conveyor support means connected with the other end portion of said upper guide members and adjustably connected with said frame, other sprocket means transversely journaled by the respective end portion of each said upper guide member, and endless chains entrained around said upper guide members.

3. Structure as specified in claim 2 in which said means for driving said conveyor means comprises a first motor supported by said frame, said motor having a drive shaft, a pair of conveyor drive shafts, supported by said frame and driveably connected, respectively, with the sprockets at one end of said upper and lower guide members, and chain and sprocket means interconnecting the drive shaft of said motor with said conveyor drive shafts for moving the latter at a constant rate of travel.

4. Structure as specified in claim 3 in which said means for driving said saws comprises a second motor having a drive shaft, and belt and pulley means connecting said second motor with one of said saw arbors.

References Cited

UNITED STATES PATENTS

| 1,018,739 | 2/1912 | Beugler | 143—37 X |
| 1,977,971 | 10/1934 | Payzant et al. | 143—37 X |
| 2,842,169 | 7/1958 | Joa | 143—49 |

WILLIAM S. LAWSON, *Primary Examiner.*

U.S. Cl. X.R.

143—37, 38, 49, 155